(12) United States Patent
Lai et al.

(10) Patent No.: US 11,569,671 B2
(45) Date of Patent: Jan. 31, 2023

(54) POWER BANK WITH AUTOMATIC DETECTION FOR CHARGING CAPABILITY

(71) Applicant: Cheng Uei Precision Industry Co., LTD., New Taipei (TW)

(72) Inventors: Hui-Lin Lai, New Taipei (TW); Jun-Yeh Liu, New Taipei (TW); Wen-Bing Hsu, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 101 days.

(21) Appl. No.: 17/237,022

(22) Filed: Apr. 21, 2021

(65) Prior Publication Data

US 2022/0037901 A1 Feb. 3, 2022

(30) Foreign Application Priority Data

Jul. 28, 2020 (CN) .......................... 202021523888.4

(51) Int. Cl.
*H02J 7/00* (2006.01)
(52) U.S. Cl.
CPC .......... *H02J 7/0047* (2013.01); *H02J 7/0068* (2013.01); *H02J 2207/20* (2020.01)

(58) Field of Classification Search
CPC ....................................................... H02J 7/00
See application file for complete search history.

(56) References Cited

U.S. PATENT DOCUMENTS

2009/0167248 A1* 7/2009 Murao .................. H02J 7/0016
320/134

* cited by examiner

*Primary Examiner* — Robert Grant
(74) *Attorney, Agent, or Firm* — Cheng-Ju Chiang

(57) ABSTRACT

A power bank with automatic detection for charging capability includes a battery unit, a control unit connected to the battery unit, an input unit, at least one output unit, a starting unit and a detecting unit. The input unit is connected to the control unit. The input unit is used for being connected with an external power source. The at least one output unit is connected to the control unit. The starting unit is connected to the control unit and the at least one output unit. The starting unit is in a grounded state to form a current loop. The detecting unit is connected to the control unit and the at least one output unit. The detecting unit is used for sensing whether a signal is transmitted from the at least one output unit.

12 Claims, 3 Drawing Sheets

POWER BANK WITH AUTOMATIC DETECTION FOR CHARGING CAPABILITY

CROSS-REFERENCE TO RELATED APPLICATION

The present application is based on, and claims priority from, China Patent Application No. 202021523888.4, filed Jul. 28, 2020, the disclosure of which is hereby incorporated by reference herein in its entirety.

BACKGROUND OF THE INVENTION

1. Field of the Invention

The present invention generally relates to a mobile power supply, and more particularly to a power bank with automatic detection for charging capability which automatically detects whether an external device is connected to the power bank with automatic detection for charging capability to automatically start a charging function of the power bank with automatic detection for charging capability.

2. The Related Art

With the popularity of smart phones and the rapid development of the smart phones, in order to carry more updated, faster, and more convenient functions, it should increase an electricity consumption. Therefore, a battery capacity of the smart phone has become a major problem in use. However, in a limited space of the smart phone, a battery of the smart phone is limited by a hardware space. Unless there is a more advanced battery module in the smart phone, it is difficult to promote an electric quantity of the smart phone.

Therefore, in order to solve a problem of the electric quantity of the smart phone, various manufacturers have introduced external power banks to provide for users, and the users are able to charge the smart phones outdoors at the time of the users staying outdoors to solve rapid electricity consumption problems of the smart phones. Types of the external power banks are divided into a continuous discharge type and a dormancy type. Differences between the continuous discharge type power bank and the dormancy type power bank are described as follows. The continuous discharge type power bank will continue releasing currents when the continuous discharge type power bank is unused. When the user connects the smart phone with the continuous discharge type power bank, the smart phone can be directly charged. The dormancy type power bank will stop a discharge function when the dormancy type power bank is unused, and the dormancy type power bank is wakened up for charging when the dormancy type power bank receives a wake-up signal. Therefore, when the dormancy type power bank is unused for a long time, the dormancy type power bank can maintain an electric quantity of the dormancy type power bank, and the continuous discharge type power bank will continue consuming an electric quantity of the continuous discharge type power bank.

When a common USB (Universal Serial Bus) type B or USB type C charging cable with ground signal function is generally used, one end of the charging cable with ground signal function is installed to the power bank in advance, and if the user wants to charge the smart phone and connect the other end of the charging cable with ground signal function to the smart phone, the charging cable with ground signal function will release a ground signal to the power bank. When the power bank receives the ground signal, the smart phone can be automatically charged by the power bank.

However, when the charging cable without ground signal function is used, one end of the charging cable without ground signal function is installed to the power bank in advance, and if the user wants to charge the smart phone, the other end of the charging cable without ground signal function is connected to the smart phone. The charging cable without ground signal function will be without releasing the ground signal to the power bank, so the power bank is without receiving the ground signal, and the power bank will be without automatically charging the smart phone. As a result, it brings an inconvenience for the user in use.

Therefore, it is necessary to provide a power bank with automatic detection for charging capability which automatically detects whether an external device is connected to the power bank with automatic detection for charging capability to automatically start a charging function of the power bank with automatic detection for charging capability, and then the power bank with automatic detection for charging capability charges the external device.

SUMMARY OF THE INVENTION

An object of the present invention is to provide a power bank with automatic detection for charging capability. The power bank with automatic detection for charging capability includes a battery unit used for storing and releasing electricity, a control unit connected to the battery unit, an input unit, at least one output unit, a starting unit and a detecting unit. When the battery unit is charged or discharged, a charged process or a discharged process of the battery unit is controlled through the control unit. The control unit has a function of controlling a voltage condition of the battery unit during the charged process or the discharged process of the battery unit. The input unit is connected to the control unit. The input unit is used for being connected with an external power source, so that an external current entering the battery unit for proceeding to charge the battery unit. The at least one output unit is connected to the control unit. The at least one output unit is used for being connected with an external device, and the at least one output unit provides electric power in the battery unit for the external device. The starting unit is connected to the control unit and the at least one output unit. The starting unit is in a grounded state to form a current loop which is provided for the battery unit to proceed to discharge. The detecting unit is connected to the control unit and the at least one output unit. The detecting unit is used for sensing whether a signal is transmitted from the at least one output unit, so that the control unit is able to control the battery unit to enter a discharged state.

Another object of the present invention is to provide a power bank with automatic detection for charging capability. The power bank with automatic detection for charging capability includes a battery unit used for storing and releasing electricity, a control unit connected to the battery unit, an input unit, at least one output unit, a starting unit and a detecting unit. When the battery unit is charged or discharged, a charged process or a discharged process of the battery unit is controlled through the control unit. The control unit has a function of controlling a voltage condition of the battery unit during the charged process or the discharged process of the battery unit. The input unit is connected to the control unit. The input unit is used for being connected with an external power source, so that an external current entering the battery unit for proceeding to charge the battery unit. The at least one output unit is connected to the control unit. The at least one output unit is used for being connected with an external device, and the at least one output unit provides electric power in the battery unit for the external device. The starting unit is connected to the control unit and the at least one output unit. The starting unit is in a grounded state to form a current loop which is provided for the battery unit to proceed to discharge. The detecting unit is connected to the control unit and the at least one output unit. The detecting unit is used for sensing whether a signal is transmitted from the at least one output unit, so that the control unit is able to control the battery unit to enter a discharged state. The power bank with automatic detection for charging capability is connected to the external device by virtue of a charging cable with a ground signal function or the charging cable without the ground signal function to charge the external device.

Another object of the present invention is to provide a power bank with automatic detection for charging capability. The power bank with automatic detection for charging capability includes a battery unit used for storing and releasing electricity, a control unit connected to the battery unit, an input unit, at least one output unit, a starting unit and a detecting unit. When the battery unit is charged or discharged, a charged process or a discharged process of the battery unit is controlled through the control unit. The control unit has a function of controlling a voltage condition of the battery unit during the charged process or the discharged process of the battery unit, at the same time, when the power bank with automatic detection for charging capability is unused, the control unit makes the power bank with automatic detection for charging capability enter a dormant state so as to discontinue a discharge action of the battery unit to maintain an electric quantity in the battery unit. The input unit is connected to the control unit. The input unit is used for being connected with an external power source, so that an external current enters the battery unit for proceeding to charge the battery unit. The at least one output unit is connected to the control unit. The at least one output unit is used for being connected with an external device, and the at least one output unit provides electric power in the battery unit for the external device. The starting unit is connected to the control unit and the at least one output unit. The starting unit is in a grounded state to form a current loop which is provided for the battery unit to proceed to discharge. The detecting unit is connected to the control unit and the at least one output unit. The detecting unit is used for sensing whether a signal is transmitted from the at least one output unit, so that the control unit is able to control the battery unit to enter a discharged state.

As described above, the power bank with automatic detection for charging capability is able to automatically detect a connection between the external device and the power bank with automatic detection for charging capability by the charging cable with the ground signal function or the charging cable without the ground signal function to automatically start a discharge function of the battery unit which is wakened up by the control unit of the power bank with automatic detection for charging capability and to automatically start a function of the power bank with automatic detection for charging capability charging the external device.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 3:
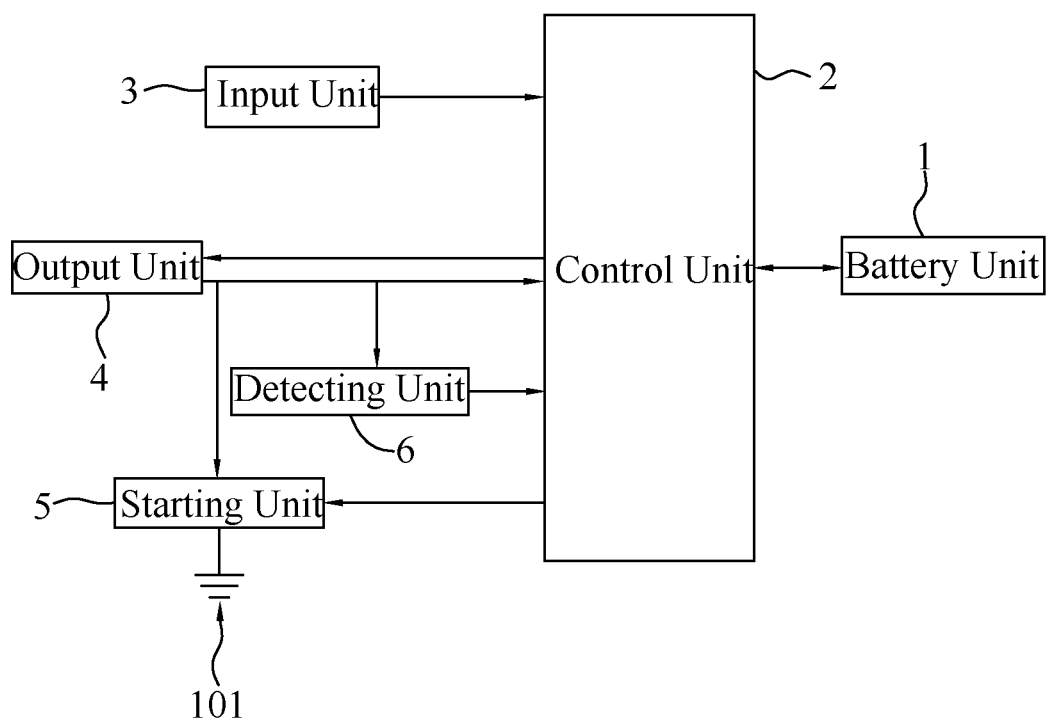
FIG. 3 is one more block diagram of the power bank with automatic detection for charging capability in accordance with the present invention.

With reference to FIG. 3, a power bank with automatic detection for charging capability 100 in accordance with the present invention is shown. The power bank with automatic detection for charging capability 100 includes a battery unit 1, a control unit 2, an input unit 3, at least one output unit 4, a starting unit 5, a ground unit 101 and a detecting unit 6.

The control unit 2 is connected to the battery unit 1. The control unit 2 is connected to the input unit 3, the at least one output unit 4 and the starting unit 5. The input unit 3 is connected to the control unit 2. The at least one output unit 4 is connected to the control unit 2, the starting unit 5 and the detecting unit 6. The starting unit 5 is also connected to the control unit 2 and the at least one output unit 4. The starting unit 5 is grounded and is shown as a grounded status. The detecting unit 6 is also connected to the control unit 2 and the at least one output unit 4.

Figure 1:
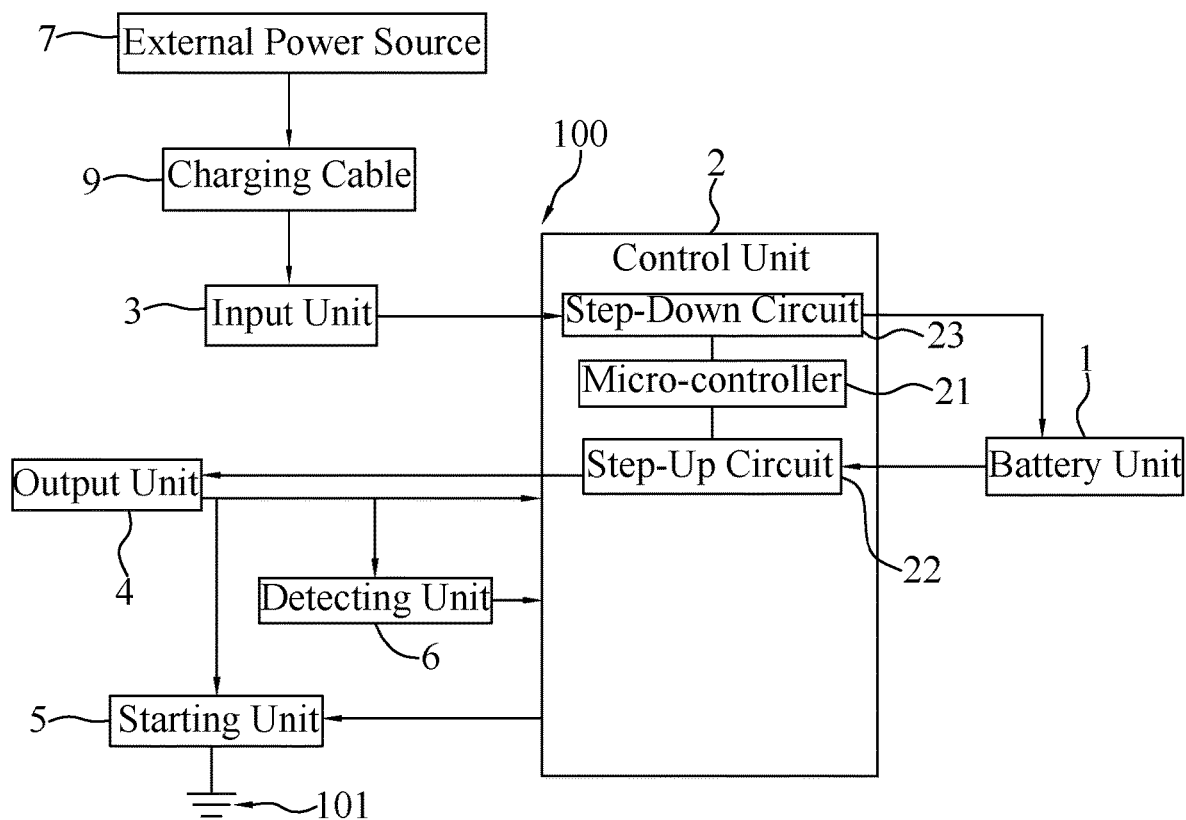
FIG. 1 is a block diagram of a power bank with automatic detection for charging capability in accordance with the present invention, wherein the power bank with automatic detection for charging capability is connected to an external power source.
Figure 2:
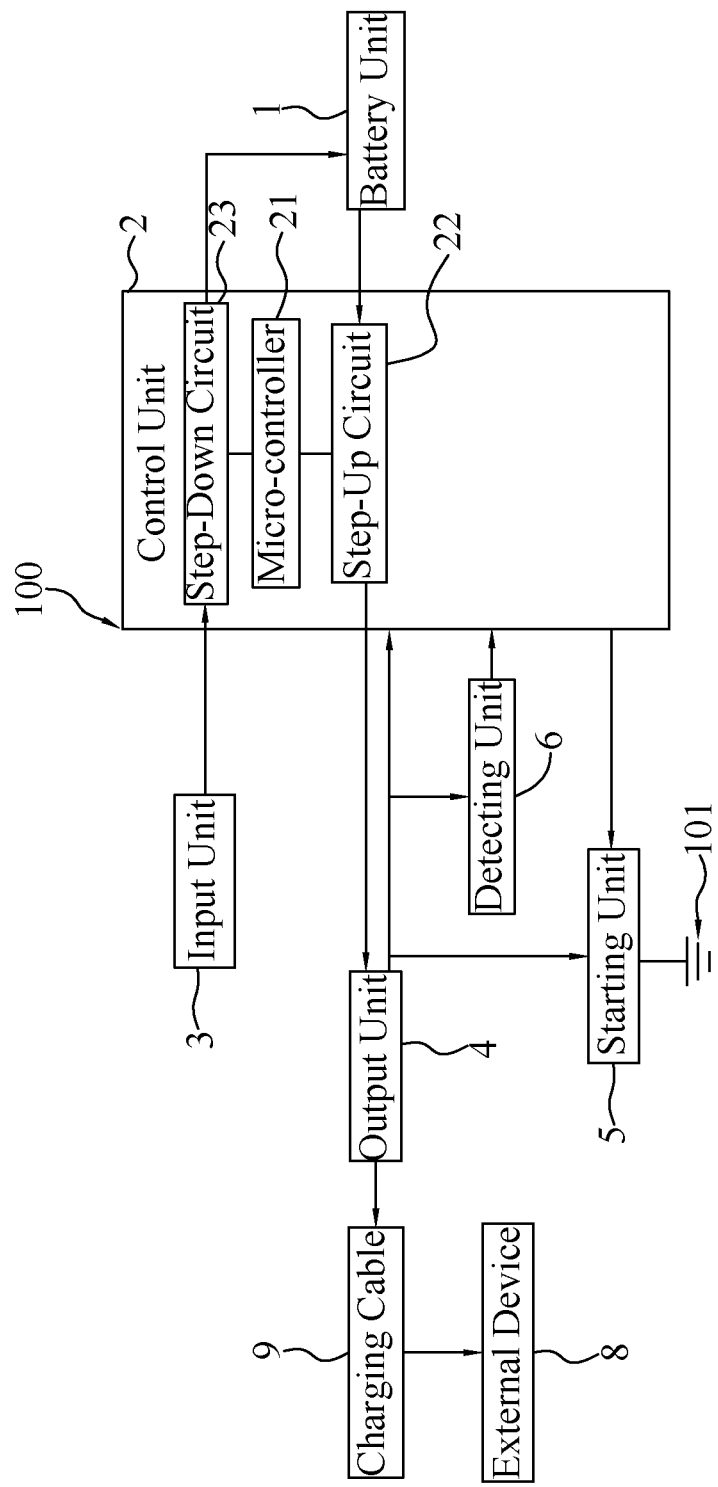
FIG. 2 is another block diagram of the power bank with automatic detection for charging capability in accordance with the present invention, wherein the power bank with automatic detection for charging capability is connected to an external device.

Referring to FIG. 1 to FIG. 3, the battery unit 1 is used for storing and releasing electricity. The control unit 2 includes a micro-controller 21, a step-up circuit 22 and a step-down circuit 23. The step-up circuit 22 is connected to the micro-controller 21. The step-down circuit 23 is connected to the micro-controller 21. The step-up circuit 22 is connected between the at least one output unit 4 and the battery unit 1. The step-down circuit 23 is connected between the input unit 3 and the battery unit 1. When the battery unit 1 is charged or discharged, a charged process or a discharged process of the battery unit 1 is proceeded and controlled through the control unit 2. The control unit 2 has a function of controlling a voltage condition of the battery unit 1 during the charged process or the discharged process. At the same time, when the power bank with automatic detection for charging capability 100 is unused, the control unit 2 will control the power bank with automatic detection for charging capability 100, and the control unit 2 make the power bank with automatic detection for charging capability 100 enter a dormant state so as to discontinue a discharge action of the battery unit 1 to maintain an electric quantity in the battery unit 1.

The input unit 3 is used for being connected with an external power 7, so that an external current enters the battery unit 1 for proceeding to charge the battery unit 1. The at least one output unit 4 is used for being connected with an external device 8, and the at least one output unit 4 provides electric power in the battery unit 1 for the external device 8. The external device 8 is able to be a mobile phone. Specifically, the external device 8 is a smart phone. The starting unit 5 is connected to the ground unit 101. The starting unit 5 is in a grounded state to form a current loop which is provided for the battery unit 1 to proceed to discharge. The detecting unit 6 is used for sensing whether a signal is transmitted from the at least one output unit 4, so that the control unit 2 is able to control the battery unit 1 to enter a discharged state, and then make the power bank with automatic detection for charging capability 100 start transmitting the electric power in the battery unit 1 to the external device 8 which is to be charged via the at least one output unit 4.

When a voltage of the battery unit 1 or the input unit 3 is overly large or overly small, the voltage of the battery unit 1 or the input unit 3 is reduced by the step-down circuit 23 or increased by the step-up circuit 22 to balance the voltage of the battery unit 1 or the input unit 3. When the battery unit 1 is discharged to charge the external device 8, and the voltage of the battery unit 1 is 4.2V, the step-up circuit 22 is acted on the battery unit 1 to make the voltage of the battery unit 1 increased to 5V, so the external device 8 is charged by 5V voltage. When the battery unit 1 is charged by the external power source 7, the external power source 7 inputs the 5V voltage, and the voltage of the input unit 3 is 5V, the step-down circuit 23 is acted on the input unit 3 to make the voltage of the input unit 3 reduced to 4.2V, so the battery unit 1 is charged by 4.2V voltage.

The power bank with automatic detection for charging capability 100 is connected to the external device 8 by virtue of a charging cable 9 with a ground signal function or the charging cable 9 without the ground signal function to charge the external device 8. When the power bank with automatic detection for charging capability 100 is in a common status, the starting unit 5 is in a virtual grounded status. When the external device 8 is inserted into the at least one output unit 4, an instantaneous surge is generated by the at least one output unit 4. The control unit 2 and the detecting unit 6 receive the surge. After the control unit 2 and the detecting unit 6 receive the surge, the control unit 2 is noticed, the control unit 2 notices the starting unit 5 to make the starting unit 5 and the at least one output unit 4 grounded, a ground loop is conductive, the battery unit 1 is started to realize a discharged output function. The charging cable 9 with a ground signal function or the cable 9 without the ground signal function detects a surge signal. Regardless of the charging cable 9 having a function of detecting a ground signal or the charging cable 9 being without the function of detecting the ground signal, the power bank with automatic detection for charging capability 100 starts charging the external device 8 automatically by virtue of the control unit 2 and the detecting unit 6 sensing the surge signal. In this case, the detecting unit 6 is selected from one of a reset IC (Integrated Circuit), a voltage detector, a power supply monitoring IC (Integrated Circuit), and a low power voltage supervisor. Preferably, the detecting unit 6 is the reset IC (Integrated Circuit).

If a user uses the charging cable 9 with the ground signal function, such as a common USB (Universal Serial Bus) type B or USB type C charging cable 9, the external device 8 is connected to the at least one output unit 4 of the power bank with automatic detection for charging capability 100 through the charging cable 9 with the ground signal function, the charging cable 9 with the ground signal function will send the ground signal into the at least one output unit 4. The at least one output unit 4 transmits this ground signal to the starting unit 5, the detecting unit 6 and the control unit 2. When the starting unit 5 receives the ground signal, the control unit 2 wakes up the battery unit 1 to discharge, thus, the power bank with automatic detection for charging capability 100 starts charging the external device 8.

If the user uses the charging cable 9 without the ground signal function, the external device 8 is connected to the at least one output unit 4 of the power bank with automatic detection for charging capability 100 through the charging cable 9 without the ground signal function, the at least one output unit 4 will send a control signal to the detecting unit 6 and the control unit 2. Then the control unit 2 transmits the control signal to the starting unit 5. When the starting unit 5 receives the control signal, the control unit 2 wakes up the battery unit 1 to discharge, thus, the power bank with automatic detection for charging capability 100 starts charging the external device 8.

As described above, the power bank with automatic detection for charging capability 100 is able to automatically detect a connection between the external device 8 and the power bank with automatic detection for charging capability 100 by the charging cable 9 with the ground signal function or the charging cable 9 without the ground signal function to automatically start a discharge function of the battery unit 1 which is wakened up by the control unit 2 of the power bank with automatic detection for charging capability 100 and to automatically start a function of the power bank with automatic detection for charging capability 100 charging the external device 8.

What is claimed is:

1. A power bank with automatic detection for charging capability, comprising:
   a battery unit used for storing and releasing electricity;
   a control unit connected to the battery unit, including a micro-controller, a step-up circuit and a step-down circuit, wherein the step-up circuit is connected to the micro-controller, the step-down circuit is connected to the micro-controller, when the battery unit is charged or discharged, a charged process or a discharged process of the battery unit being controlled through the control unit, the control unit having a function of controlling a voltage condition of the battery unit during the charged process or the discharged process of the battery unit;
   an input unit connected to the control unit, the input unit being used for being connected with an external power source, so that an external current entering the battery unit for proceeding to charge the battery unit;
   at least one output unit connected to the control unit, the at least one output unit being used for being connected with an external device, and the at least one output unit providing electric power in the battery unit for the external device;
   a starting unit connected to the control unit and the at least one output unit, the starting unit being in a grounded state to form a current loop which is provided for the battery unit to proceed to discharge; and
   a detecting unit connected to the control unit and the at least one output unit, the detecting unit being used for sensing whether a signal is transmitted from the at least one output unit, so that the control unit is able to control the battery unit to enter a discharged state.

2. The power bank with automatic detection for charging capability as claimed in claim 1, wherein the step-up circuit is connected between the at least one output unit and the battery unit.

3. The power bank with automatic detection for charging capability as claimed in claim 1, wherein the step-down circuit is connected between the input unit and the battery unit.

4. The power bank with automatic detection for charging capability as claimed in claim 1, wherein the detecting unit is a reset IC (Integrated Circuit).

5. A power bank with automatic detection for charging capability, comprising:
   a battery unit used for storing and releasing electricity;

a control unit connected to the battery unit, including a micro-controller, a step-up circuit and a step-down circuit, wherein the step-up circuit is connected to the micro-controller, the step-down circuit is connected to the micro-controller, when the battery unit is charged or discharged, a charged process or a discharged process of the battery unit being controlled through the control unit, the control unit having a function of controlling a voltage condition of the battery unit during the charged process or the discharged process of the battery unit;

an input unit connected to the control unit, the input unit being used for being connected with an external power source, so that an external current entering the battery unit for proceeding to charge the battery unit;

at least one output unit connected to the control unit, the at least one output unit being used for being connected with an external device, and the at least one output unit providing electric power in the battery unit for the external device;

a starting unit connected to the control unit and the at least one output unit, the starting unit being in a grounded state to form a current loop which is provided for the battery unit to proceed to discharge; and a detecting unit connected to the control unit and the at least one output unit, the detecting unit being used for sensing whether a signal is transmitted from the at least one output unit, so that the control unit is able to control the battery unit to enter a discharged state;

wherein the power bank with automatic detection for charging capability is connected to the external device by virtue of a charging cable with a ground signal function or the charging cable without the ground signal function to charge the external device.

6. The power bank with automatic detection for charging capability as claimed in claim 5, wherein the step-up circuit is connected between the at least one output unit and the battery unit.

7. The power bank with automatic detection for charging capability as claimed in claim 5, wherein the step-down circuit is connected between the input unit and the battery unit.

8. The power bank with automatic detection for charging capability as claimed in claim 5, wherein the detecting unit is a reset IC (Integrated Circuit).

9. A power bank with automatic detection for charging capability, comprising:

a battery unit used for storing and releasing electricity;

a control unit connected to the battery unit, including a micro-controller, a step-up circuit and a step-down circuit, wherein the step-up circuit is connected to the micro-controller, the step-down circuit is connected to the micro-controller, when the battery unit is charged or discharged, a charged process or a discharged process of the battery unit being controlled through the control unit, the control unit having a function of controlling a voltage condition of the battery unit during the charged process or the discharged process of the battery unit, at the same time, when the power bank with automatic detection for charging capability is unused, the control unit making the power bank with automatic detection for charging capability enter a dormant state so as to discontinue a discharge action of the battery unit to maintain an electric quantity in the battery unit;

an input unit connected to the control unit, the input unit being used for being connected with an external power source, so that an external current enters the battery unit for proceeding to charge the battery unit;

at least one output unit connected to the control unit, the at least one output unit being used for being connected with an external device, and the at least one output unit providing electric power in the battery unit for the external device;

a starting unit connected to the control unit and the at least one output unit, the starting unit being in a grounded state to form a current loop which is provided for the battery unit to proceed to discharge; and a detecting unit connected to the control unit and the at least one output unit, the detecting unit being used for sensing whether a signal is transmitted from the at least one output unit, so that the control unit is able to control the battery unit to enter a discharged state.

10. The power bank with automatic detection for charging capability as claimed in claim 9, wherein the step-up circuit is connected between the at least one output unit and the battery unit.

11. The power bank with automatic detection for charging capability as claimed in claim 9, wherein the step-down circuit is connected between the input unit and the battery unit.

12. The power bank with automatic detection for charging capability as claimed in claim 9, wherein the detecting unit is a reset IC (Integrated Circuit).

* * * * *